United States Patent
Wiemker et al.

(10) Patent No.: US 9,092,886 B2
(45) Date of Patent: Jul. 28, 2015

(54) RENDERING A VIEW FROM AN IMAGE DATASET

(75) Inventors: Rafael Wiemker, Kisdorf (DE); Thomas Buelow, Grosshansdorf (DE); Thomas Blaffert, Hamburg (DE)

(73) Assignee: Koninklijke Philips N.V., Eindhoven (NL)

( * ) Notice: Subject to any disclaimer, the term of this patent is extended or adjusted under 35 U.S.C. 154(b) by 1876 days.

(21) Appl. No.: 12/063,111

(22) PCT Filed: Aug. 10, 2006

(86) PCT No.: PCT/IB2006/052765
§ 371 (c)(1),
(2), (4) Date: Mar. 5, 2010

(87) PCT Pub. No.: WO2007/017845
PCT Pub. Date: Feb. 15, 2007

(65) Prior Publication Data
US 2010/0149214 A1 Jun. 17, 2010

(30) Foreign Application Priority Data
Aug. 11, 2005 (EP) .................................... 05107374

(51) Int. Cl.
*G06K 9/00* (2006.01)
*G06T 19/00* (2011.01)

(52) U.S. Cl.
CPC ............. *G06T 19/00* (2013.01); *G06T 2210/41* (2013.01); *G06T 2219/008* (2013.01)

(58) Field of Classification Search
CPC ........................................................ G06T 19/00
USPC ......................................................... 382/128
See application file for complete search history.

(56) References Cited

U.S. PATENT DOCUMENTS

| 7,184,814 | B2 * | 2/2007 | Lang et al. ..................... 600/416 |
| 7,355,605 | B2 * | 4/2008 | Cathier ......................... 345/589 |
| 7,693,299 | B2 * | 4/2010 | Vasilescu et al. ............. 382/100 |
| 2005/0105829 | A1 | 5/2005 | Cathier | |

FOREIGN PATENT DOCUMENTS

| WO | 2004049265 A1 | 6/2004 |
| WO | 2005031649 A1 | 4/2005 |

OTHER PUBLICATIONS

Horst Haussecker, et al: A Tensor Approach for Local Structure Analysis in Multi-Dimensional Images, Internet Citation, Published 3D Image Analysis and Synthesis, Nov. 18, 1996, pp. 171-178, XP002311193.

(Continued)

*Primary Examiner* — Hiep V Nguyen

(57) ABSTRACT

The invention relates to a rendering system (100) for rendering a view from an image dataset, the rendering system comprising a selecting unit (110) for selecting a subset of the image dataset, a computing unit (120) for computing a first principal axis of a tensor on the basis of the subset of the image dataset, and a rendering unit (130) for rendering the view on the basis of the first principal axis. Using the information about the directionality and orientation of a structure, comprised in the selected subset of the image dataset and extracted from the first principal axis of the tensor, the rendering system (100) is arranged to effectively assist the user in selecting an advantageous view from the image dataset.

22 Claims, 5 Drawing Sheets

(56) References Cited

OTHER PUBLICATIONS

Figure 1:
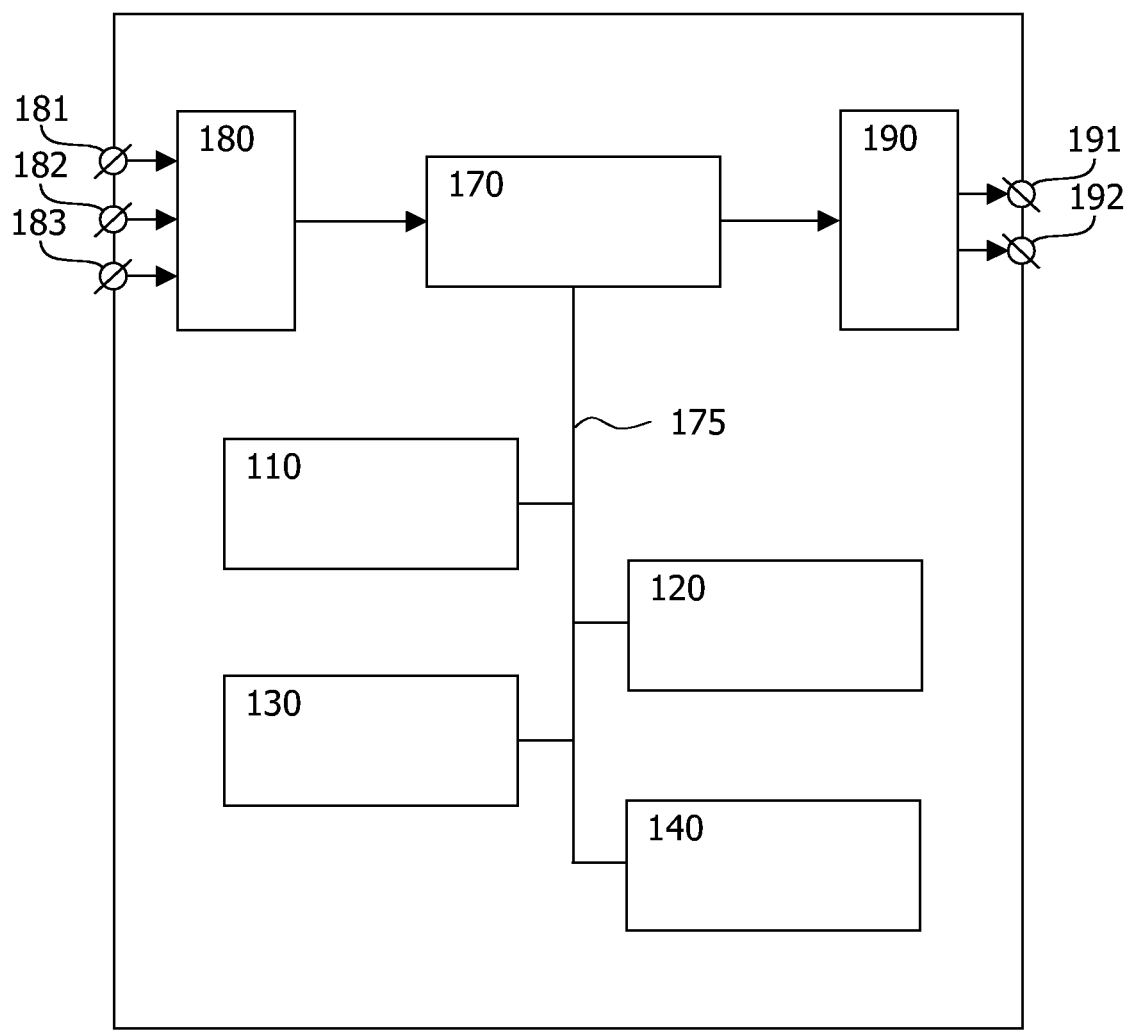

Lucas J. Van Vliet, et al: Estimators for Orientation and Anisotropy in Digitized Images, Proceedings of the Annual Conference of the Advanced School for Computing and Imaging, May 1995, pp. 442-450, XP002299342.

Rafael Wiemker, et al: Unsupervised Extraction of the Pulmonary Interlobar Fissures From High Resolution thoracic CT Data, International Congress Series, Experpta Medical, Amsterdam, NL, vol. 1281, May 2005, pp. 1121-1126, XP005081831.

Derek R. Ney, et al: Editing Tools for 3D Medical Imaging, IEEE Computer Graphics and Applications, The John Hopkins Medical Institutions, Nov. 1991, pp. 63-71.

Rudolf Mester, et al: Orientation Estimation: Conventional Techniques and a New Non-Differential Approach, Institute for Applied Physics, Frankfurt/M., Germany.

Dietrich G. W. Onnasch, et al: Geometric Image Correction and Iso-Center Calibration at Oblique Biplane Angiographic Views, 1992 IEEE, Biomedical Engineering, University of Kiel, Germany, 1992, pp. 647-650.

Jane P. Ko, et al: Computer-Aided Diagnosis and the Evaluation of Lung Disease, Thorac Imaging, vol. 19, No. 3, Jul. 2004, pp. 136-155.

Ivan Viola, et al: Importance-Driven Volume Rendering, IEEE Visualization, Oct. 10-15, 2004, Austin Texas, USA, pp. 1-7.

A. Ravishankar Rao, et al: Computing Oriented Texture Fields, Computer Vision and Pattern Recognition, CVPR, IEEE Computer Society, Jun. 4-8, 1989, pp. 61-68.

Lloyd N. Trefethen et al; "Numerical Linear Algebra", Soc. for Industrial & Applied Math, May 1, 1997, Chapter 5.

William H. Press et al; "Numerical Recipes in C: The Art of Scientific Computing", Cambridge Univ. Press; 2D Edition Oct. 30, 1992, Chapter 11.

Barthold Lichtenbelt et al; "Introduction to Volume Rendering", Hewlett-Packard Professional Books, Prentice Hall; BK&CK-Rom Edition 1998.

* cited by examiner

RENDERING A VIEW FROM AN IMAGE DATASET

This invention relates to a rendering system for rendering a view from an image dataset.

The invention further relates to an image acquisition system for acquiring an image dataset comprising said rendering system.

The invention further relates to a workstation comprising said rendering system.

The invention further relates to a rendering method of rendering a view from an image dataset.

The invention further relates to a computer program product to be loaded by a computer arrangement, comprising instructions for rendering a view from an image dataset.

An embodiment of the method of the kind described in the opening paragraph is known from the paper "Computer Aided Diagnosis and the Evaluation of Lung Disease" by Jane P. Ko and David P. Naidich, published in the Journal of Thoracic Imaging 19 (2004) 136-155. This article describes a computer program product for an interactive lung nodule assessment. The method of displaying and navigating a 3D image dataset employed by the computer program product uses a cartwheel allowing 180-degree circumnavigation of a relatively small volume of interest (VOI) comprising a lung nodule. The orientation of the cartwheel determines the orientation of the VOI. The sequence of VOI projections obtained by varying the orientation of the cartwheel can be displayed as a movie. Viewing the cartwheel projections facilitates and accelerates the manual navigation in the 3D image dataset and is helpful in selecting an optimal view of the nodule comprised in the VOI. However, this method still requires the user to select the optimal view of the VOI. This is inconvenient, relatively time-consuming, and prone to error.

It is an object of the invention to provide a rendering system of the kind described in the opening paragraph that is arranged to effectively assist the user in selecting an advantageous view from the image dataset.

This object of the invention is achieved in that the rendering system for rendering a view from an image dataset comprises:

a selecting unit (110) for selecting a subset of the image dataset;

a computing unit (120) for computing a first principal axis of a tensor on the basis of the subset of the image dataset; and a rendering unit (130) for rendering the view on the basis of the first principal axis, thereby rendering the view from the image dataset.

The selecting unit is arranged to select a subset of the image dataset comprising a structure or a part thereof, hereinafter also referred to as a structure. An example of such structure is a lung nodule. The subset of the image dataset is used by the computing unit to capture information relating to the directionality and orientation of the structure. This is achieved by computing a first principal axis of a tensor on the basis of the subset of the image dataset. The tensor is a structure tensor, for example. The definition and properties of the structure tensor in a multidimensional image dataset are described in an article "A tensor approach for local structure analysis in multi-dimensional images" by Horst Haußecker and Bernd Jähne, published in 3D Image Analysis and Synthesis '96, Ed. by B. Girod et al, Sankt Augustin 1996, 171-178, hereinafter referred to as Ref. 1. In order to qualify the structure, it is advantageous to render a view from the image dataset comprising the structure, which view is optimized. The first principal axis of the tensor advantageously defines an approximate main axis of the structure comprised in the image dataset. Thus the rendering unit is arranged to render a view from the image dataset on the basis of the first principal axis. The view can be a cross-section of the image dataset through a plane substantially mutually equal to a plane perpendicular to the first principal axis of the structure tensor. Alternatively, the view can be a cross-section of the image dataset through a plane substantially mutually equal to a plane comprising the first principal axis of the structure tensor. The rendered view can be used by a medical practitioner such as a radiologist for qualifying the structure comprised in the image dataset. The user input for selecting the subset of the image dataset may comprise as little manual interaction as positioning the mouse pointer over the structure, optionally followed a by mouse click. Thereby the rendering system is arranged to effectively assist the user in selecting an advantageous view from the image dataset.

The rendering system of the present invention is useful for rendering the view from a multidimensional image dataset, especially from a 3D and/or a 4D image dataset. The image dataset can be obtained from any of the many imaging modalities such as Magnetic Resonance Imaging (MRI)), Computed Tomography (CT), Ultrasound, Positron Emission Tomography (PET), and Single Photon Emission Computed Tomography (SPECT).

In an embodiment of the rendering system according to the invention, the view is a cross-section of the image dataset through a plane substantially mutually equal to a plane comprising the first principal axis. This view is especially advantageous for an elongate structure such as a blood vessel or a part thereof, hereinafter referred to as a blood vessel, when the first principal axis corresponds to the smallest principal component of the tensor.

In a further embodiment of the rendering system according to the invention, the view is a projection of the image dataset along an axis substantially mutually equal to the first principal axis. This view is especially advantageous for an elongate structure such as a blood vessel, when the first principal axis corresponds to the largest principal component of the tensor. The Maximum Intensity Projection or the Iso-surface Projection can be employed for rendering the view from the image dataset revealing the elongate structure with its main axis being perpendicular to the projection direction.

In a further embodiment of the rendering system according to the invention, the computing unit is arranged to compute a second principal axis of the tensor and the view is a cross-section of the image dataset through a plane substantially mutually equal to a plane comprising the first principal axis and the second principal axis. This view is especially advantageous for carrying out measurements in order to estimate dimensions of the viewed structure.

In a further embodiment of the rendering system according to the invention, the rendering system comprises a user interface for communicating with the rendering system. Combining the rendering system with a user interface allows the user to communicate with the rendering system. The user interface is arranged to display a view from the image dataset to the user for selecting a structure of interest. The user interface is further arranged to assist the selecting of the subset of the image dataset. Optionally, the user interface is arranged to prompt the user to choose a method of selecting the subset of the image dataset and/or to choose a type of view for rendering, and to receive the user selection of the selecting method and/or of the view type, respectively.

In a further embodiment of the rendering system according to the invention, the tensor is any one of the following: a structure tensor, a tensor of inertia, and a Hessian matrix. Depending on the application and the image dataset, the most advantageous of these tensors can be chosen to implement the rendering system of the current invention. Optionally, the rendering system can be arranged to select one of these tensors on the basis of an input and/or on the basis of an evaluation.

In a further embodiment of the rendering system according to the invention, the selecting unit is arranged to select the subset of the image dataset on the basis of a seed. The seed is inputted using the user interface, which is arranged to display a view from the image dataset. The user can now visually inspect the image dataset to find a structure of interest. Then the user can click the mouse at a location close to the center of the structure. The selecting unit is arranged to receive this location. This location defines the seed of the subset of the image dataset. The selecting unit is further arranged to grow the subset of the image dataset on the basis of the seed.

In a further embodiment of the rendering system according to the invention, the selecting unit is arranged to add an element of the image dataset to the subset of the image dataset on the basis of a distance between the seed and the element of the image dataset. If the distance between the seed and the element of the image dataset is less than a predetermined value then the selecting unit is arranged to add the element to the subset of the image dataset.

In a further embodiment of the rendering system according to the invention, the selecting unit is arranged to evaluate multiple candidate subsets of the image dataset by computing respective features for qualifying the candidate subsets and to select the subset of the image dataset on the basis of the evaluation. The usefulness of the tensor computed on the basis of the subset of the image dataset depends on the quality of the selection of the subset. If the subset is too small, the tensor may describe local properties of a structure of interest. If the subset is too large, the tensor may be isotropically averaged over too many structures comprised in the subset of the image dataset leading to a loss of meaningful directional information. A useful feature for qualifying the candidate subsets is a sum of squares of differences between the principal components of the tensor. The selecting unit is arranged to select the subset corresponding to the maximum of the sum.

In a further embodiment of the rendering system according to the invention, the selecting unit is further arranged to select a set of weights for weighing each element of the subset of the image dataset and the computing unit is further arranged to compute the first principal axis and, optionally, other tensor characteristics on the basis of the set of weights. This allows the weighing of a contribution of each element from the selected subset to the first principal axis and to other computed tensor characteristics. The weight of each element can be based, for example, on a distance between the element and the seed. The skilled person will appreciate that this general approach is equivalent to replacing the subset of an image dataset with a window function, as described in Chapter 3 of Ref. 1.

It is a further object of the invention to provide an image acquisition system of the kind described in the opening paragraph that is arranged to effectively assist the user in selecting an advantageous view from the image dataset. This is achieved in that the image acquisition system comprises a rendering system for rendering a view from an image dataset, the rendering system comprising:

a selecting unit for selecting a subset of the image dataset;
a computing unit for computing a first principal axis of a tensor on the basis of the subset of the image dataset; and
a rendering unit for rendering the view on the basis of the first principal axis, thereby rendering the view from the image dataset.

It is a further object of the invention to provide a workstation of the kind described in the opening paragraph that is arranged to effectively assist the user in selecting an advantageous view from the image dataset. This is achieved in that the workstation comprises a rendering system for rendering a view from an image dataset, the rendering system comprising:

a selecting unit for selecting a subset of the image dataset;
a computing unit for computing a first principal axis of a tensor on the basis of the subset of the image dataset; and
a rendering unit for rendering the view on the basis of the first principal axis, thereby rendering the view from the image dataset.

It is a further object of the invention to provide a rendering method of the kind described in the opening paragraph that is arranged to effectively assist the user in selecting an advantageous view from the image dataset. This is achieved in that the rendering method comprises:

a selecting step for selecting a subset of the image dataset;
a computing step for computing a first principal axis of a tensor on the basis of the subset of the image dataset; and
a rendering step for rendering the view on the basis of the first principal axis, thereby rendering the view from the image dataset.

It is a further object of the invention to provide a computer program product of the kind described in the opening paragraph that is arranged to effectively assist the user in selecting an advantageous view from the image dataset. This is achieved in that the computer program product to be loaded by a computer arrangement, the computer program product comprising instructions for rendering a view from an image dataset, the computer arrangement comprising a processing unit and a memory, after being loaded, provides said processing unit with the capability to carry out the following tasks:

selecting a subset of the image dataset;
computing a first principal axis of a tensor on the basis of the subset of the image dataset; and
rendering the view on the basis of the first principal axis, thereby rendering the view from the image dataset.

Modifications and variations thereof, of the image acquisition system, of the workstation, of the rendering method, and/or of the computer program product, which correspond to modifications to the rendering system and variations thereof, being described, can be carried out by a skilled person on the basis of the present description.

Figure 2:
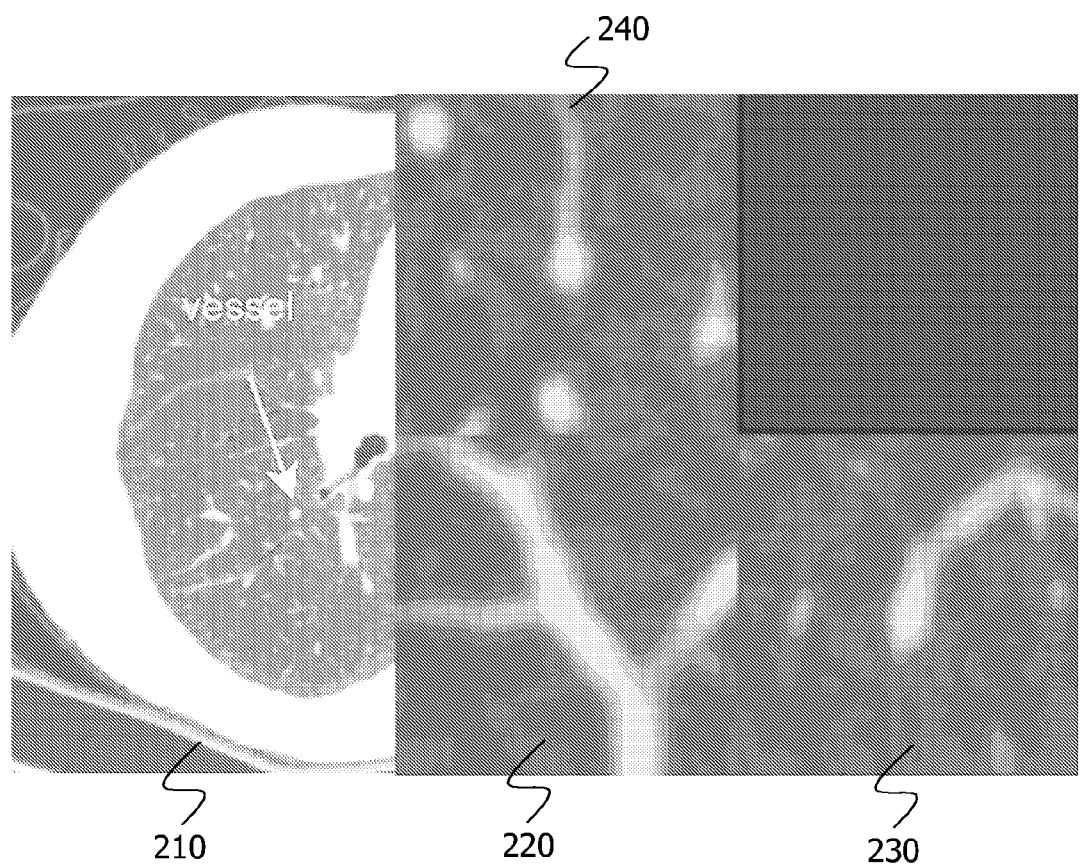
Figure 3:
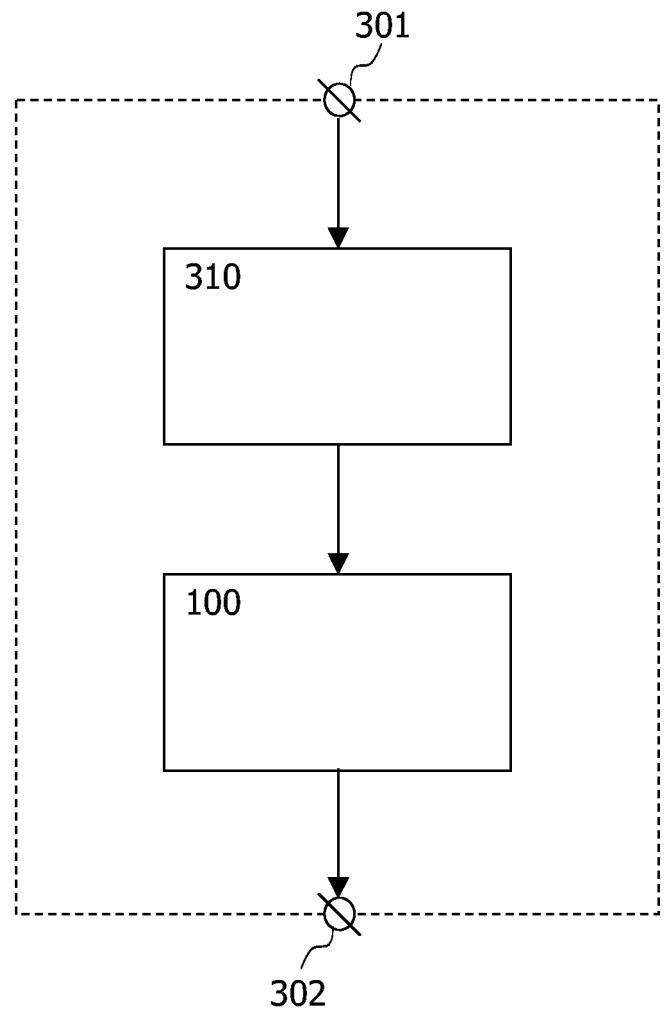
Figure 4:
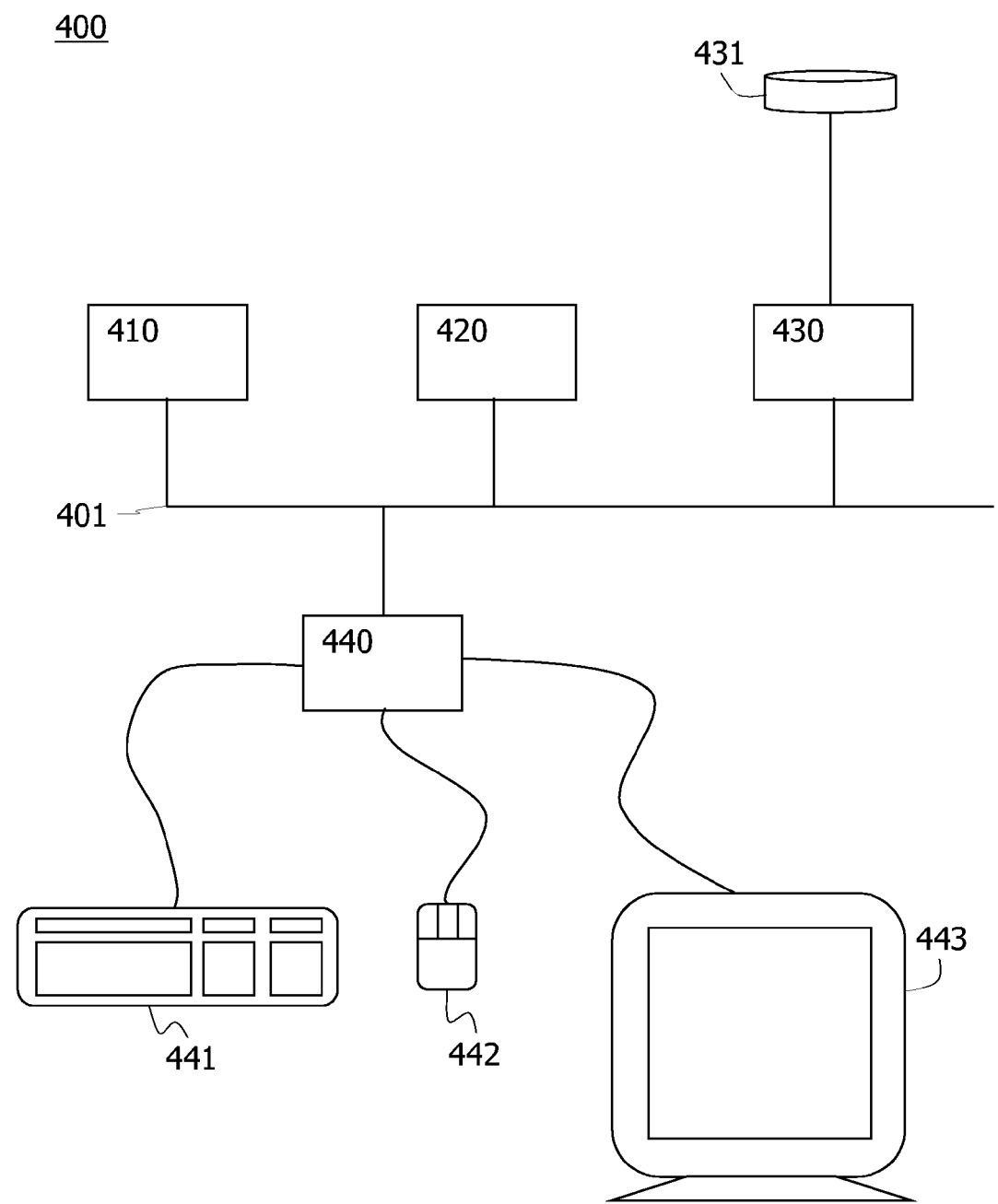

These and other aspects of the rendering system, of the image acquisition system, of the workstation, of the rendering method, and of the computer program product according to the invention will become apparent from and will be elucidated with respect to the implementations and embodiments described hereinafter and with reference to the accompanying drawings, wherein:

FIG. 1 schematically shows an embodiment of the rendering system;

FIG. 2 shows a cross-section in the axial slice (left) and three advantageous cross-sections;

FIG. 3 schematically shows an embodiment of the image acquisition system;

FIG. 4 schematically shows an embodiment of the workstation; and

Figure 5:
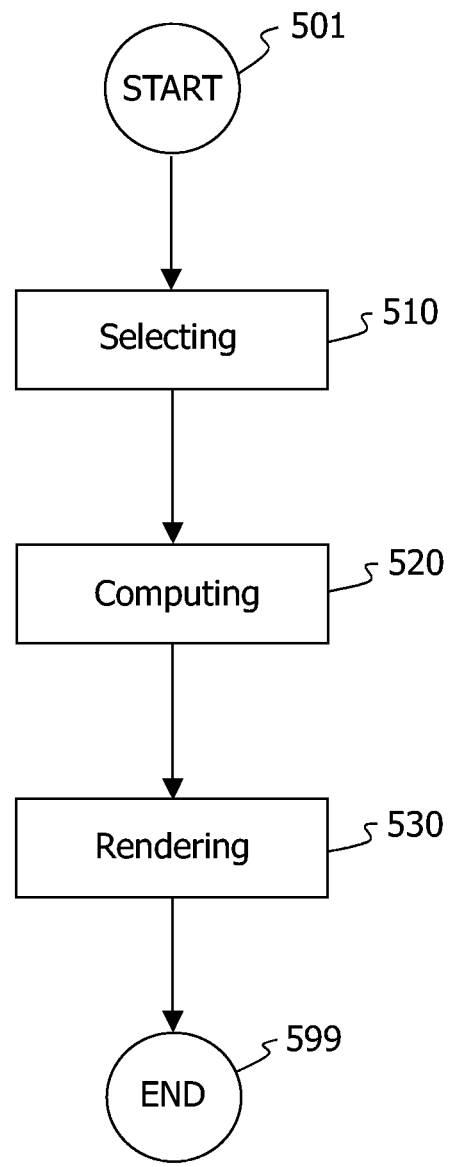

FIG. 5 schematically shows an embodiment of the rendering method.

The same reference numerals are used to denote similar parts throughout the figures.

FIG. 1 schematically shows an embodiment of the rendering system 100 for rendering a view from an image dataset, the rendering system comprising:

a selecting unit 110 for selecting a subset of the image dataset;

a computing unit 120 for computing a first principal axis of a tensor on the basis of the subset of the image dataset; and a rendering unit 130 for rendering the view on the basis of the first principal axis, thereby rendering the view from the image dataset.

Optionally, the rendering system 100 comprises:

a user interface 140 for communicating with the rendering system 100; and a memory unit 170 for storing input and output data.

In the embodiment of the rendering system 100 shown in FIG. 1, there are three input connectors 181, 182 and 183 for the incoming data. The first input connector 181 is arranged to receive data incoming from data storage such as a hard disk, a magnetic tape, flash memory, or an optical disk. The second input connector 182 is arranged to receive data incoming from a user input device such as a mouse or a touch screen. The third input connector 183 is arranged to receive data incoming from a user input device such as a keyboard. The input connectors 181, 182 and 183 are connected to an input control unit 180.

In the embodiment of the rendering system 100 shown in FIG. 1, there are two output connectors 191 and 192 for the outgoing data. The first output connector 191 is arranged to output the data to data storage such as a hard disk, a magnetic tape, flash memory, or an optical disk. The second output connector 192 is arranged to output the data to a display device. The output connectors 191 and 192 receive the respective data via an output control unit 190.

The skilled person will understand that there are many ways to connect input devices to the input connectors 181, 182 and 183 and the output devices to the output connectors 191 and 192 of the rendering system 100. These ways comprise, but are not limited to, a wired and a wireless connection, a digital network such as a Local Area Network (LAN) and a Wide Area Network (WAN), the Internet, a digital telephone network, and an analog telephone network.

In an embodiment of the rendering system 100 according to the invention, the rendering system comprises a memory unit 170. The memory unit 170 is arranged to receive an input data from external devices via any of the input connectors 181, 182, and 183 and to store the received input data in the memory unit 170. Loading the data into the memory unit 170 allows a quick access to relevant data portions by the units of said rendering system 100. The input data comprises the image dataset. The memory unit 170 can be implemented by devices such as a Random Access Memory (RAM) chip, a Read Only Memory (ROM) chip, and/or a hard disk. Preferably, the memory unit 170 comprises a RAM for storing the image dataset. The memory unit 170 is also arranged to receive data from and to deliver data to the units of the rendering system 100 comprising the selecting unit 110, the computing unit 120, and the rendering unit 130 via the memory bus 175. The memory unit 170 is further arranged to make the data available to external devices via any of the output connectors 191 and 192. Storing the data from the units of the rendering system 100 in the memory unit 170 advantageously improves the performance of the units of the rendering system 100 as well as the rate of transfer of data from the units of the rendering system 100 to external devices.

Alternatively, the rendering system 100 does not comprise the memory unit 170 and the memory bus 175. The input data used by the rendering system 100 is supplied by at least one external device, such as external memory or a processor, connected to the units of the rendering system 100. Similarly, the output data produced by the rendering system 100 is supplied to at least one external device, such as external memory or a processor, connected to the units of the rendering system 100. The units of the rendering system 100 are arranged to receive the data from each other via internal connections or via a data bus.

In a further embodiment of the rendering system 100 according to the invention, the rendering system comprises a user interface 140 for communicating with the rendering system 100. The user interface 140 comprises a display unit for displaying data to the user and a selection unit for making selections. Combining the rendering system 100 with a user interface 140 allows the user to communicate with the rendering system 100. The user interface 140 is arranged to display a view from the image dataset to the user for selecting a structure of interest. The user interface 140 is further arranged to assist the selecting of the subset of the image dataset. Optionally, the user interface can comprise a plurality of modes of operation of the rendering system such as a mode determining the method of selecting the subset of the image dataset, and/or the type and/or the number of views rendered from the image dataset.

Alternatively, the rendering system 100 can employ an external input device and/or an external display connected to the rendering system via the input connectors 182 and/or 183 and the output connector 192. The skilled person will understand that there exist a large number of user interfaces that can be advantageously implemented as a unit of the rendering system 100 of the current invention.

The selecting unit 110 is arranged to select a subset of the image dataset. The subset of the image dataset is used to determine an advantageous view of a structure in the image dataset. To this end the computing unit 120 is arranged to use the subset of the image dataset to capture information relating to the directionality and orientation of the structure. In an embodiment of the rendering system 100 according to the invention, a view, such as an axial slice rendered from the image dataset, is displayed on a display device. The user uses a mouse to select a structure, which the user wants to view, by positioning the mouse pointer and clicking the mouse button over the structure. The selecting unit 110 is arranged to receive the location selected by the user and to use this location to select an element of the image dataset near the location, preferably the closest element, as a seeding element, hereinafter referred to as a seed. The seed is further used for growing the subset of the image dataset. Each element from the image dataset, such that the distance between the element and the seed element is less than a predetermined distance threshold, is included with the subset of the image dataset. The distance is a geometrical distance between the location of the seed and the location of the element, for example the Euclidean distance. Alternatively, the distance can be a topological distance.

In a further embodiment of the rendering system 100 according to the invention, the seed comprises a plurality of elements from the image dataset. Using the mouse, the user is allowed to encircle an area in the displayed view. The seed comprises the plurality of elements from the image dataset located in the encircled area. Next, each element from the image dataset such that the distance between the element and an element from the seed is less than a predetermined distance threshold is added to the selected subset.

In a further embodiment of the rendering system 100 according to the invention, the user interface 140 for selecting the subset of the image dataset comprises a plurality of containers such as a sphere. The user selects a container from a menu and places the selected container in the displayed view of the image dataset. The selected subset of the image dataset comprises elements located inside the container. Optionally the user interface may allow reshaping the sphere into an oval, reshaping the oval, translating the sphere or the oval, and rotating the oval.

In a further embodiment of the rendering system 100 according to the invention, the selecting unit 110 is arranged to enable selecting the subset of the image dataset on the basis of image segmentation. The user selects a seed comprised in a structure identified during the image segmentation. This has the effect that the selected subset of the image dataset comprises all elements belonging to the selected structure. The results of the image segmentation are stored in the memory unit 170. Alternatively, the selecting unit 110 comprises a segmentation system for delineating the structure comprising the seed. Any segmentation system that is sufficiently fast for the rendering system can be employed for this purpose.

The computing unit 120 is arranged to compute a first principal axis of a tensor on the basis of the subset of the image dataset. Optionally, the computing unit is also arranged to compute other characteristics of the tensor. The characteristics of the tensor may comprise, for example, components of the tensor and other principal axes of the tensor. In an embodiment of the rendering system 100 according to the invention, the plurality of characteristics comprises components of a structure tensor in the system of coordinates of the image dataset, the principal components of the structure tensor, and the principal axes of the structure tensor. The structure tensor J(P) at a location P is a tensor product of the gradient vector G(P) at P and the gradient vector G(P) at P. Hence, the tensor J(P) is a quadratic function of the gradient vector G(P). Therefore J(P) is independent of the sign of the gradient vector G(P). Yet, the structure tensor still comprises information on the directionality and orientation of the structure at the location P. In addition, the structure tensor J(P) is positive definite so that all principal components of the structure tensor are non-negative. A method of computing gradients from an image dataset is described in Section 3 of Ref. 1 and in Section 2 of an article "Computing oriented texture fields" by A. Ravishankar Rao and Brian G. Schnuck, Computer Vision and Pattern Recognition, CVPR '89, IEEE Computer Society, Jun. 4-8, 1989, pages 61-68. The structure tensor describes the directionality and orientation of a structure at the location P. The directionality and orientation of the structure tensor J(P) in a neighborhood U of P, comprising locations of elements from the subset of the image dataset, is described by a sum of structure tensors J(P') over all locations P' in U. This sum is also referred to as the structure tensor J(P). The location P can be an arbitrary location in U. The location P defines the origin of a coordinate system for the components and principal axes of the structure tensor. This location is hereinafter referred to as the structure location. A common choice for the structure location is the seeding point. Alternatively, the structure location P is the mass center of the subset of the image dataset or the geometric center of U. The neighborhood U is uniquely equivalent to the subset of the image dataset. U is equal to the projection of the subset of the image dataset into the spatial or spatial-temporal domain. The subset of the image dataset is a set comprising pairs (P', I(P')) for all P'∈U, where I(P') is the intensity at location P'.

A method of computing the components of the structure tensor from an image dataset is described in Section 3 of Ref. 1 The computed structure tensor comprises ten independent components in 4D, six independent components in 3D, or 3 independent components in 2D. The computed tensor components are stored in the memory unit 170 for further processing by the computing unit 120 and/or for use by the rendering unit 130. Although the description of the invention is based on 3D images, the current invention can be applied to any multidimensional image dataset.

There are several methods of computing the principal components $\{T_\xi, T_\eta, T_\zeta\}$ and the principal axes $\{\xi, \eta, \zeta\}$ of a tensor, both algebraic and numerical, and these methods can be found in a textbook on linear algebra and/or on numerical methods, for example in Numerical Linear Algebra by Lloyd N. Trefethen and David Bau, Soc for Industrial & Applied Math (May 1, 1997), Chapter 5, and in Numerical Recipes in C: The Art of Scientific Computing by William H. Press, Brian P. Flannery, Saul A. Teukolsky, and William T. Vetterling, Cambridge University Press; 2nd edition (Oct. 30, 1992), Chapter 11. The six spherical components $\{T_{00}, T_{2-2}, T_{2-1}, T_{20}, T_{21}, T_{22}\}$ of a symmetric tensor can be derived from the six Cartesian components $\{T_{xx}, T_{xy}, T_{xz}, T_{yy}, T_{yz}, T_{zz}\}$ using the formulae:

$$T_{00} = \frac{1}{\sqrt{3}}(T_{xx} + T_{yy} + T_{zz}),$$

$$T_{20} = \frac{1}{\sqrt{6}}(2T_{zz} - T_{xx} - T_{yy}),$$

$$T_{2\pm1} = \frac{1}{\sqrt{2}}(T_{xz} \pm iT_{yz}),$$

$$T_{2\pm2} = \frac{1}{2}(T_{xx} - T_{yy} \pm \sqrt{2}\,iT_{xy}),$$

where i stands for the imaginary unit. Advantageously, the spherical components can also be derived from the principal components $\{T_\xi, T_\eta, T_\zeta\}$:

$$T_{00} = \frac{1}{\sqrt{3}}(T_\xi + T_\eta + T_\zeta),$$

$$T_{20} = \frac{1}{\sqrt{6}}(2T_\zeta - T_\xi - T_\eta),$$

$$T_{2\pm1} = 0,$$

$$T_{2\pm2} = \frac{1}{2}(T_\xi - T_\eta).$$

For an isotropic structure all principal components of the tensor are the same and thus $T_{20}$ and $T_{2\pm2}$ (i.e. $T_{22}$ and $T_{2-2}$) are zero. The component $T_{00}$ is also referred to as the isotropic component of the tensor. Sometimes, the non-normalized isotropic component $$T_{iso} = \frac{1}{3}(T_\xi + T_\eta + T_\zeta)$$

is used instead of $T_{00}$. Since $T_{iso}$ is the same for any set of Cartesian coordinates of the tensor, it can also be derived from $$T_{iso} = \frac{1}{3}(T_{xx} + T_{yy} + T_{zz}).$$

If the image dataset is uniform, $T_{iso}=0$.

For a structure having an axial symmetry with the $\zeta$ principal axis chosen to be the symmetry axis of the structure, such as a tube or a cylinder, the components $T_{2\pm2}$ (i.e. $T_{22}$ and $T_{2-2}$) are zero. This implies that $T_\xi$ and $T_\eta$ are mutually equal. The component $T_{20}$ quantifies the deviation of the structure from an isotropic symmetry. The less isotropic is the structure the larger the absolute value of $T_{20}$. Sometimes the non-normalized component $$T_{axial} = T_\zeta - \frac{1}{2}(T_\xi + T_\eta)$$

is used instead of $T_{20}$.

The last two components, the components $T_{2\pm2}$ (i.e. $T_{22}$ and $T_{2-2}$), are mutually equal. Assuming that the main symmetry axis is chosen to be the $\zeta$ principal axis, the two components quantify how much the symmetry of the structure deviates from an axial symmetry. The less axially symmetric is the structure the larger the absolute value of $T_{2\pm2}$. Sometimes the non-normalized component $T_{non-axial} = T_\xi - T_\eta$ is used instead of $T_{2\pm2}$.

There are many embodiments of the rendering system 100 according to the invention differing in the characteristics of the tensor computed by the computing unit 120. The described embodiments serve the purpose of illustrating the present invention and are not intended to limit the scope of the claims. For example, the computing unit 120 can be arranged to compute the six Cartesian tensor components in the system of coordinates of the image dataset. The computing unit 120 can be further arranged to derive the smallest principal component of the tensor and the principal axis corresponding to the smallest principal component using the Ritz variational principle. This embodiment is especially advantageous to render a view of an elongate structure such as a blood vessel, where the principal axis corresponding to the smallest principal component of the tensor is substantially mutually equal to the main axis of the structure near the seed. Alternatively, the computing unit 120 can be arranged to compute the six Cartesian tensor components in the system of coordinates of the image dataset. The computing unit 120 can be further arranged to derive the largest principal component of the tensor and the principal axis corresponding to the largest principal component using the Ritz variational principle. This embodiment is also advantageous for rendering a view of an elongate structure such as a blood vessel, where the principal axis corresponding to the largest principal component of the tensor is substantially mutually equal to an axis perpendicular to the main axis of the structure.

The rendering unit 130 is arranged to render the view from the image dataset on the basis of the first principal axis and on the basis of the structure location. In an embodiment of the rendering system 100 according to the invention, the rendering unit 130 renders three cross-section views from the image dataset. The computing unit 120 is arranged to compute three principal axes of the tensor. Each pair of the principal axes defines a viewing plane. The rendering unit 130 is arranged to render three cross-section views of the image dataset by three planes, each plane substantially mutually equal to the plane comprising a pair of principal axes.

In an embodiment of the rendering system 100 according to the invention, the rendering unit 130 renders one cross-section view from the image dataset. The view corresponds to a cross-section of the image dataset through a plane substantially mutually equal to a plane comprising a first principal axis of the tensor computed by the computing unit. This embodiment is especially advantageous for rendering a view of an elongate structure such as a blood vessel, when the first principal axis corresponds to the smallest principal component of the tensor. In this case the first principal axis defines the direction substantially mutually equal to the main axis of the structure. There are many planes comprising the principal axis. Since a blood vessel has approximately an axial local symmetry with the main axis being the local axial symmetry axis, a plane substantially mutually equal to any one of the planes comprising the principal axis is good for viewing. The rendering unit 130 is arranged to select one viewing plane. Optionally, the rendering unit 130 and the user interface 140 can be arranged to allow the user to select another viewing plane or to rotate the viewing plane about an axis substantially mutually equal to the first principal axis, rendering a sequence of views which can be displayed as a movie. Alternatively, if a second principal axis is computed or known, the view may be a planar cross-section view defined by the plane substantially mutually equal to a plane comprising the first principal axis and the second principal axis. This arrangement is especially advantageous for measuring sizes of and distances between elements of the structure.

In an embodiment of the rendering system 100 according to the invention, the rendering unit 130 renders a 3D view from the image dataset. The view is a projection of the image dataset along an axis substantially mutually equal to the first principal axis. The present invention is not constrained to any specific image rendering technique. For example, the Maximum Intensity Projection (MIP) algorithm or the Iso-surface Projection (IsP) algorithm can be used. In MIP the pixel is set to the maximum intensity along the ray. In IsP the rays are terminated at an iso-surface. The iso-surface is defined by the locations of elements having the same intensity. More information on image rendering can be found in Barthold Lichtenbelt, Randy Crane, and Shaz Naqvi, Introduction to Volume Rendering (Hewlett-Packard Professional Books) Prentice Hall; Bk&CD-Rom edition (1998). The projection view is especially advantageous for an elongate structure such as a blood vessel, when the first principal axis corresponds to the largest principal component of the tensor. Such first principal axis is perpendicular to the principal axis corresponding to the smallest principal component, which is substantially mutually equal to the main axis of the structure. Thus the projection advantageously shows the elongate structure with its main axis being substantially perpendicular to the projection direction. If another structure obscures the view of the structure of interest, the view obscuring structure can be removed or its transparency can be increased as described in an article "Importance driven volume rendering" by Ivan Viola, Armin Kanitsar, and Meister Eduard Grolier, IEEE Visualization 2004, October 10-15, Austin, Tex., USA.

Optionally, the user interface 140 can be arranged to allow the user to select a view to be rendered from the image dataset. The rendering system 100 can be arranged to compute the characteristics of a tensor for rendering the selected view and to render the selected view. Optionally, each of the views can be rescaled, for example magnified, and/or clipped.

The skilled person will appreciate that there are many ways to select the subset of the image dataset, to choose useful characteristics of a tensor to be computed by the computing unit 120, and to render a view from the image dataset on the basis of the chosen useful characteristics. The described embodiments illustrate the present invention and do not limit the scope of the claims.

There are a few tensors, which can yield information about the directionality and orientation of a structure in the image dataset. In an embodiment of the rendering system 100 according to the invention, the tensor is a structure tensor. The structure tensor is a sensitive indicator of the directionality and orientation in the image dataset. Alternatively, an inertia tensor can be used to define the directionality and orientation of the structure in the image dataset. The inertia tensor is especially useful when applied to objects in segmented images. Yet one more option is to use the Hessian matrix of partial second derivatives of the image dataset. The eigenvalues and eigenvectors of a Hessian matrix can be used instead of the principal components and principal axes of a tensor. Optionally, the computing unit 120 can be arranged to compute a first principal axis and/or a first eigenvector as well as, optionally, other tensor characteristics and/or matrix characteristics for each tensor and/or matrix from a plurality of tensors and/or matrices, respectively. The computing unit 120 can be further arranged to evaluate the usefulness of the computed first principal axes and/or first eigenvectors as well as of the other optionally computed tensor characteristics and/or matrix characteristics, respectively, for rendering a view from the image dataset. For example, the computing unit can be arranged to select the tensor or the matrix with the largest anisotropy defined, for example, by the difference between the largest and the smallest principal components or eigenvalues, respectively. Alternatively, the user may choose the tensor or matrix to be used for rendering a view from the image dataset.

The skilled person will appreciate that there are other tensors and/or matrices that can be used to determine the directionality and orientation of a structure in the image dataset and to select an advantageous view of the structure on the basis of the first principal axis and/or of the first eigenvector of the said tensor or matrix, respectively, as disclosed in the present invention. The structure tensor, the inertia tensor and the Hessian matrix are used to illustrate the advantages of the invention and do not limit the scope of the claims. Throughout the description of the current invention, the terms "tensor", "principal component" and "principal axis" also mean "matrix", "eigenvalue", and "eigenvector", respectively.

As has already been emphasized, a good selection of the subset of the image dataset is essential for a successful determination of the first principal axis and, optionally, of other tensor characteristics. Thus, in an embodiment of the rendering system 100 according to the invention, the selecting unit 110 is arranged to evaluate multiple candidate subsets of the image dataset by computing respective features for qualifying the candidate subsets and to select the subset of the image dataset on the basis of the evaluation. The user selects a seed and the selecting unit 110 is arranged to select the subset of the image dataset comprising elements from the image dataset such that the distance between the seed and the element is less than a predetermined minimum distance. Next, the selecting unit 110 is arranged to compute a feature for qualifying the subset of the image dataset. Preferably, the selecting unit 110 is arranged to employ the computing unit 120 to carry out the computation. A useful qualifying feature is a measure of directionality. There are many measures of directionality. Some useful measures of directionality can be extracted from the principal components of the tensor.

A normalized directionality measure is given by the formula $$D_1=(|T_{20}|^2+2|T_{2+1}|^2+2|T_{2+2}|^2)/|T_{00}|^2=((T_\xi-T_\eta)^2+(T_\eta-T_\zeta)^2+(T_\zeta-T_\xi)^2)/(T_\xi+T_\eta+T_\zeta)^2=((T_{xx})^2+(T_{yy})^2+(T_{zz})^2+2(T_{xy})^2+2(T_{xz})^2+2(T_{yz})^2-3(T_{iso})^2)/(3T_{iso})^2 \in [0,2]$$

Advantageously, $D_1$ can be derived from the set of spherical components, from the set of principal components, and from the set of Cartesian components. For an isotropic tensor, the value of the directionality measure is zero. For an axially symmetric tensor with a single small principal component and two rather large principal components, the directionality measure is about 0.5. This or a similar (i.e. close to 0.5) value can be expected for a long tubular or cylindrical structure with relatively uniform intensity in the direction parallel to the symmetry axis, such as a blood vessel. For an axially symmetric tensor with two small and one relatively large principal component, the directionality measure is about 2. This or a similar (i.e. close to 2) value can be expected for an elongate axially symmetric structure, which is relatively uniform in each plane perpendicular to the symmetry axis and which has a sharply changing intensity, i.e. a strong gradient, in the direction of the symmetry axis.

Alternatively, for cylindrical structures such as blood vessels, with the cylinder axis substantially mutually equal to the $\zeta$ principal axis, a useful directionality measure is given by the formula:

$$D_2 = \frac{1}{2}(2T_\zeta - T_\xi - T_\eta)^2 / (T_\xi + T_\eta + T_\zeta)^2 \in [0, 2].$$

Or, for the principal components $T_\xi \geq T_\eta \geq T_\zeta \geq 0$, one can use $$D_3=(T_\xi+T_\eta-T_\zeta)/(T_\xi+T_\eta+T_\zeta)\in[0,1].$$

The skilled person will understand that there are other directionality measures and that the current invention is not restricted to any particular choice of the directionality measure.

After computing the directionality measure for the predetermined minimum radius, the selecting unit 110 is arranged to iteratively increment the radius by a predetermined increment and to recalculate the respective directionality measure for each radius up to a predetermined maximum radius. The values of the radius and of the directionality measure are stored in the memory unit 170 for evaluation. The optimum values of the predetermined minimum radius and the predetermined maximum radius as well as of the predefined increment depend on the image dataset and on the structure to be viewed and may be user-defined parameters. When the value of the directionality measure is computed for each candidate subset of the image dataset, the selection unit 110 is arranged to select the optimum subset of the image dataset corresponding to the optimum value of the directionality measure, such as the maximum of the directionality measure. Alternatively, the selecting unit 110 can employ another algorithm for searching the optimum of the feature, such as the steepest ascent algorithm. The optimum subset is subsequently used by the rendering system 100 to render the view from the image dataset.

In a further embodiment of the rendering system 100 according to the invention, the selecting unit 110 is further arranged to select a set of weights for weighing each element of the subset of the image dataset and the computing unit 120 is further arranged to compute the first principal axis and, optionally, other tensor characteristics on the basis of the set of weights. This allows the weighing of a contribution of each element from the selected subset to the first principal axis and to other computed tensor characteristics. The weight of each element can be based, for example, on a distance between the element and the seed. Alternatively, the weights can be assigned by the user. The skilled person will appreciate that this general approach is equivalent to replacing the subset of an image dataset with a window function, as described in Chapter 3 of Ref. 1.

The skilled person will understand that other embodiments and implementations of the rendering system 100 according to the invention are also possible. It is possible, among other things, to redefine the units of the system and to reassign their functions. For example, in an embodiment of the rendering system 100 of the current invention, the computing unit 120 can be split between the selection unit 110 and the rendering unit 130. The part comprised in the selection unit 110 can be arranged to perform the computations necessary for evaluating the candidate image dataset while the part comprised in the rendering unit 130 can be arranged to compute the first principal axis and other characteristics of a tensor needed for rendering the view from the image dataset. In a further embodiment of the rendering system 100 according to the invention, there can be a plurality of computing units replacing the computing unit 120 of previous embodiments, each computing unit arranged to compute a first principal axis and, optionally, other characteristics of a different tensor. The user interface 140 can be arranged to prompt the user to select a first principal axis for rendering the view from the image dataset on the basis of the evaluation of the used tensors.

The selecting unit 110, the computing unit 120, and the rendering unit 130 may be implemented using a processor. Normally, their functions are performed under the control of a software program product. During execution, the software program product is loaded into a memory, like a RAM, and executed from there. The program may be loaded from a background memory, like a ROM, hard disk, or magnetic and/or optical storage, or may be loaded via a network like Internet. Optionally an application specific integrated circuit may provide the described functionality.

There are many possible applications of the rendering system 100 of the current invention. An advantageous application is the application of the rendering system 100 to a medical image dataset. The rendering system 100 of the current invention can be also useful in other applications. For example, the rendering system 100 can be useful in cell morphology for rendering advantageous views of cell structures.

FIG. 2 shows a cross-section in the axial slice 210 and three advantageous cross-sections 220, 230 and 240. The axial slice 210 of a patient chest is shown left. The arrow points to a white dot in the image. This can be a cross-section of a nodule or of a vessel. There is no way to discriminate the two possibilities on the basis of the axial slice. To obtain a better view of the structure represented by the dot in the left image, the user can move the mouse pointer and click the mouse button in the neighborhood of the dot thereby selecting a seed of the subset of the image dataset. The selecting unit 110 is then triggered to select an optimum subset of the image dataset and the computing unit 120 is arranged to compute the three principal axes of the structure tensor and the structure location. The rendering unit renders three cross-sections 220, 230 and 240 of the structure by the three planes defined by the three pairs of principal axes. The three magnified and clipped views 220, 230 and 240 of the structure are shown to the right of the axial slice 210. In the cross-section view 220 it can be clearly seen that the structure is a blood vessel—not a nodule.

FIG. 3 schematically shows an embodiment of the image acquisition system 300 employing the rendering system 100 of the invention, said image acquisition system 300 comprising an image acquisition system unit 310 connected via an internal connection with the rendering system 100, an input connector 301, and an output connector 302. This arrangement advantageously increases the capabilities of the image acquisition system 300 providing said image acquisition system 300 with advantageous image viewing capabilities of the rendering system 100. The viewing capabilities may prove particularly useful when the image acquisition system 300 is further arranged for an interactive image acquisition, thus enabling the operator to decide which data to acquire on the basis of the viewed images. Examples of image acquisition systems are a CT system, an X-ray system, an MRI system, an Ultrasound system, a Positron Emission Tomography (PET) system, and a Single Photon Emission Computed Tomography (SPECT) system.

FIG. 4 schematically shows an embodiment of the workstation 400. The workstation comprises a system bus 401. A processor 410, a memory 420, a disk input/output (I/O) adapter 430, and a user interface (UI) 440 are operatively connected to the system bus 401. A disk storage device 431 is operatively coupled to the disk I/O adapter 430. A keyboard 441, a mouse 442, and a display 443 are operatively coupled to the UI 440. The rendering system 100 of the invention, implemented as a computer program, is stored in the disk storage device 431. The workstation 400 is arranged to load the program and input data into memory 420 and execute the program on the processor 410. The user can input information to the workstation 400 using the keyboard 441 and/or the mouse 442. The workstation is arranged to output information to the display device 443 and/or to the disk 431. The skilled person will understand that there are numerous other embodiments of the workstation known in the art and that the present embodiment serves the purpose of illustrating the invention and must not be interpreted as limiting the invention to this particular embodiment.

FIG. 5 schematically shows an embodiment of the rendering method 500. The START step 501 begins rendering the view from the image dataset according to the method 500. In the Selecting step 510 the subset of the image dataset is selected. The subset comprises elements of the image dataset located in a sphere. The center of the sphere is at the location of the seed selected by the user. The radius of the sphere is also determined by the user. In the Computing step 520 the three principal axes of the structure tensor are computed on the basis of the subset of the image dataset. In the Rendering step 530 the views from the image dataset are rendered on the basis of the three principal axes of the structure tensor. Each view is a cross-section view of the image dataset through a plane, which is substantially mutually equal to the plane comprising a different pair of principal axes of the structure tensor. The END step 599 terminates rendering the view from the image dataset according to the method 500.

The order in the described embodiments of the method of the current invention is not mandatory; the skilled person may change the order of steps or perform steps concurrently using threading models, multi-processor systems or multiple processes without departing from the concept as intended by the present invention.

The rendering system 100 of the invention may be implemented as a computer program product and can be stored on any suitable medium such as, for example, magnetic tape, magnetic disk, or optical disk. This computer program can be loaded into a computer arrangement comprising a processing unit and a memory. The computer program product, after being loaded, provides the processing unit with the capability to carry out the rendering, tasks.

It should be noted that the above-mentioned embodiments illustrate rather than limit the invention and that those skilled in the art will be able to design alternative embodiments without departing from the scope of the appended claims. In the claims, any reference signs placed between parentheses shall not be construed as limiting the claim. The word "comprising" does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. In the system claims enumerating several units, several of these units can be embodied by one and the same item of hardware or software. The usage of the words first, second and third, etcetera does not indicate any ordering. These words are to be interpreted as names.

The invention claimed is:

1. A rendering system for rendering a view from an image dataset, the rendering system comprising:
   a selecting unit for selecting a subset of the image dataset;
   a computing unit for computing a first principal axis of a tensor on the basis of the subset of the image dataset; and
   a rendering unit for rendering the view on the basis of the first principal axis, thereby rendering the view from the image dataset,
   wherein the selecting unit is arranged to evaluate multiple candidate subsets of the image dataset by computing respective features for qualifying the candidate subsets and to select the subset of the image dataset on the basis of the evaluation.

2. The rendering system as claimed in claim 1, wherein the image dataset is a medical diagnostic image dataset and the subset comprises a selected anatomical structure.

3. The rendering system as claimed in claim 2, wherein the computing unit is arranged to:
   compute a second principal axis of the tensor, and
   wherein the view is a cross-section of the image dataset by a plane substantially mutually equal to a plane including the first principal axis and the second principal axis.

4. The rendering system as claimed in claim 1, wherein the anatomical structure is a nodule.

5. The rendering system as claimed in claim 1, further including:
   a user interface for communicating with the rendering system.

6. The rendering system as claimed in claim 1, wherein the tensor is any one of the following:
   a structure tensor;
   a tensor of inertia; and
   a Hessian matrix.

7. The rendering system as claimed in claim 1, wherein the selecting unit is arranged to:
   select the subset of the image dataset on the basis of a seed.

8. The rendering system as claimed in claim 7, wherein the selecting unit is further arranged to;
   add an element of the image dataset to the subset of the image dataset on the basis of a distance between the seed and the element of the image dataset.

9. The rendering system as claimed in claim 1 wherein the selecting unit is further arranged to:
   select a set of weights for weighting each element of the subset of the image dataset; and
   wherein the computing unit is further arranged to compute the first principal axis on the basis of the set of weights.

10. A rendering method of rendering a view from an image dataset, the rendering method comprising:
    with a user input device, selecting a location in the image dataset,
    with a computer processor:
       selecting a subset of the image dataset representing a structure in the selected location;
       computing a first principal axis of a tensor on the basis of the subset of the image dataset; and
       rendering the view on the basis of the first principal axis, thereby rendering the view from the image dataset and controlling a display device to display the rendered view,
    wherein selecting the subset includes, with the computer processor, evaluating multiple candidate subsets of the image dataset by computing respective features for qualifying the candidate subsets and selecting the subset of the image dataset on the basis of the evaluation.

11. The method as claimed in claim 10, wherein the subset of the image dataset comprises an anatomical structure.

12. The method as claimed in claim 10, wherein the anatomical structure is a nodule.

13. The method as claimed in claim 11, further including:
    computing a second principal axis of the tensor with the computer processor; and
    wherein the view is a cross-section of the image dataset by a plane substantially mutually equal to a plane including the first principal axis and the second principal axis.

14. The method as claimed in claim 10, further including:
    communicating with the rendering system with the user interface.

15. The method as claimed in claim 10, wherein the tensor is any one of the following:
    a structure tensor;
    a tensor of inertia; and
    a Hessian matrix.

16. The method as claimed in claim 10, further including:
    selecting the subset of the image dataset on the basis of a seed.

17. The method as claimed in claim 16, further including:
    with the computer processor, adding an element of the image dataset to the subset of the image dataset on the basis of a distance between the seed and the element of the image dataset.

18. The method as claimed in claim 10, further including:
    selecting a set of weights for weighing each element of the subset of the image dataset; and
    computing the first principal axis on the basis of the set of weights.

19. A non-transitory computer readable medium carrying a computer program product which controls one or more processors to:
    select a subset of the image dataset;
    compute a first principal axis of a tensor on the basis of the subset of the image dataset; and
    render a view on the basis of the first principal axis, thereby rendering the view from the image dataset,
    wherein, selecting the subset of the image dataset comprises evaluating multiple candidate subsets of the image dataset by computing respective features for qualifying the candidate subsets and selecting the subset of the image dataset on the basis of the evaluation.

20. A rendering system for rendering a view of an anatomical structure from a diagnostic image dataset, the system comprising:
    a display device configured to display at least one view of the diagnostic image dataset;
    a user input device configured to input a location of the anatomical structure in the displayed at least one view of the diagnostic image dataset;
    a computer processor configured to:
       receive the input location of the anatomical structure,
       segment the anatomical structure,
       compute a first principal axis of a tensor on the basis of the segmented anatomical structure,
       render a view on the basis of the first principal axis, and control the display device to display the rendered view.

21. The system as claimed in claim 20, wherein the anatomical structure is a nodule.

22. The system as claimed in claim 20, wherein the computer processor is further configured to:
   compute a second principal axis of the tensor; and
   render the view by rendering a plane substantially mutually equal to a plane including the first and second principal axes.

* * * * *